United States Patent [19]
Conte et al.

[11] Patent Number: 5,908,579
[45] Date of Patent: Jun. 1, 1999

[54] PROCESS FOR PRODUCING HIGH-POROSITY NON-EVAPORABLE GETTER MATERIALS AND MATERIALS THUS OBTAINED

[75] Inventors: Andrea Conte, Milan; Sergio Carella, Varese, both of Italy

[73] Assignee: SAES Getters, S.p.A., Lainate, Italy

[21] Appl. No.: 08/820,555

[22] Filed: Mar. 19, 1997

Related U.S. Application Data

[63] Continuation-in-part of application No. 08/792,794, Feb. 3, 1997, and application No. 08/477,100, Jun. 7, 1995, abandoned.

[30] Foreign Application Priority Data

Dec. 2, 1994 [IT] Italy ................................. MI94A2449
Apr. 14, 1995 [IT] Italy ................................. MI95A0779

[51] Int. Cl.⁶ .............................. H01J 7/18; H01J 35/20; H01K 1/56
[52] U.S. Cl. .................................... 252/181.6; 252/181.1; 252/181.2
[58] Field of Search ............................. 252/181.1, 181.2, 252/181.6, 188.1

[56] References Cited

U.S. PATENT DOCUMENTS

| | | | |
|---|---|---|---|
| 4,360,444 | 11/1982 | Esterl et al. | 252/181.1 |
| 4,385,019 | 5/1983 | Bernstein et al. | 264/49 |
| 4,428,856 | 1/1984 | Boyarina et al. | 252/181.1 |
| 4,671,889 | 6/1987 | Schreiner et al. | 252/181.2 |
| 4,874,339 | 10/1989 | Bratz | 445/28 |
| 4,940,300 | 7/1990 | Giorgi | 313/559 |
| 5,130,047 | 7/1992 | Nagel | 252/181.6 |
| 5,242,559 | 9/1993 | Giorgi | 204/181.4 |
| 5,320,496 | 6/1994 | Manini et al. | 417/51 |
| 5,324,172 | 6/1994 | Manini et al. | 417/51 |
| 5,544,490 | 8/1996 | Manini et al. | 62/46.1 |
| 5,685,963 | 11/1997 | Lorimer et al. | 204/298.03 |

FOREIGN PATENT DOCUMENTS

| | | |
|---|---|---|
| 2171076 | 9/1973 | France . |
| 22 04 714 | 8/1973 | Germany . |
| 1 373 473 | 11/1974 | United Kingdom . |
| 2 077 487 | 12/1981 | United Kingdom . |

*Primary Examiner*—Joseph D. Anthony
*Attorney, Agent, or Firm*—Hickman Stephens & Coleman, LLP

[57] ABSTRACT

A process is disclosed for producing non-evaporable getter materials having high porosity and improved gas sorption rates. The process includes mixing together a metallic getter element, a getter alloy and a solid organic compound, all three components being in the form of powders having specific particle sizes. The mixture is subjected to a compression of less than about 1000 kg/cm$^2$ and is sintered at a temperature between about 900° C. and about 1200° C. for a period between about 5 minutes and about 60 minutes. The getter material thus obtained is used to produce getter bodies shaped as pellets, sheets or discs having better mechanical strength than similar bodies of other getter material having comparable porosity.

18 Claims, 10 Drawing Sheets

Fig. 2b  ■ Grafite  □ Zr

Fig. 4b  ■ Grafite  □ Zr

PROCESS FOR PRODUCING HIGH-POROSITY NON-EVAPORABLE GETTER MATERIALS AND MATERIALS THUS OBTAINED

CROSS-REFERENCE TO RELATED APPLICATIONS

This application claims priority under 35 U.S.C. § 120 as a continuation-in-part of U.S. patent application Ser. No. 08/792,794 which was filed on Feb. 3, 1997 still pending; and U.S. patent application Ser. No. 08/477,100 which was filed on Jun. 7, 1995, now abandoned. Both of these patent applications are incorporated herein by reference in their entirety and for all purposes.

BACKGROUND OF THE INVENTION

1. The Field of the Invention

The present invention relates to field of getter materials. In particular, the present invention relates to processes for making non-evaporable getter materials having a very high porosity and to the getter materials thus obtained.

2. The Relevant Art

Non-evaporable getter materials (known in the art as "NEGs") are widely used for creating and maintaining high vacuum conditions. Such conditions are required commonly for devices such as thermal insulators, lamps and in semiconductor processing chambers. These materials also are used for the purification of gases for application in processes requiring gases of high purity such as semiconductor manufacturing processes. Common NEG materials include metals such as zirconium (Zr), titanium (Ti), niobium (Nb), tantalum (Ta), vanadium (V) and their alloys. The alloys can include additional elements, such as aluminum (Al) and/or iron (Fe), for example, the alloy having a weight percentage composition Zr 84%—Al 16% which is manufactured and sold by SAES® Getters S.p.A. (Lainate, Italy) under the tradename St 101 or the alloy having a weight percentage composition Zr 70%—V 24.6%—Fe 5.4%, also manufactured and sold by SAES® Getters under the tradename St 707.

Getter materials act by chemisorption of gases such as carbon monoxide (CO), carbon dioxide ($CO_2$), water ($H_2O$), molecular oxygen ($O_2$), and molecular hydrogen ($H_2$). Apart from $H_2$, which dissociates and diffuses inside the getter material even at low temperatures, the other gases remain chemisorbed on the surface of the getter material over temperatures which range from about 200° C. to about 500° C., depending on the NEG material. The diffusion of the chemisorbed species into the material occurs at higher temperatures.

The surface characteristics of the NEG material play a fundamental role in the sorption of reactive gases. A large specific surface (surface per unit weight) of the material and access of the gases to the surface of the NEG material are parameters of fundamental importance to the performance of the NEG. These parameters would be optimized by the use of NEG materials in the form of powders, but powdered NEG materials cannot be used in practice. Rather, the powder NEG materials either are compressed into pellets which are sintered to impart mechanical strength, loaded and compressed in open containers, or rolled onto a support. Regardless of the form employed, the compression and/or heat sintering operations reduce the specific surface of the NEG materials with respect to the starting powder. Moreover, most of the getter particles reside within the interior bulk of the sintered getter material where the gases to be sorbed have only limited access with a consequential decrease in the sorption capacity of the device and in the gas sorption rate.

German Patent Application DE-A-2,204,714 discloses a method for preparing porous NEG devices based on metallic zirconium. According to this method, graphite powder is added to the zirconium powder, along with a third organic component, for example ammonium carbamate, whose weight may reach the total weights of the zirconium and graphite. During the heat sintering treatment the organic component evaporates, leaving a porous structure consisting of zirconium and graphite which acts as an anti-sintering agent for zirconium; thus preventing an excessive reduction in the specific surface of the zirconium.

However, the above-cited German patent application refers only to the use of elemental components and does not mention the use of alloys. Also, the organic component is added in the form of powder of millimeter-sized grains. Due to the large grain size of the organic component, the final getter device has a high porosity with respect to its geometric volume. The porosity distribution obtained, however, does not enhance access of gases to the surface of the internal NEG material grains. Furthermore, the materials thus prepared have poor mechanical properties.

British Patent GB-2,077,487 discloses a porous NEG material obtained from a powder mixture of a metallic getter material, such as titanium or zirconium, and the previously mentioned St 707 alloy as an anti-sintering agent. According to the disclosure, the particles of metallic material have a size of about 125 $\mu$m, while the particles of the St 707 alloy have a size of less than 400 $\mu$m but are larger than the size of the metallic component. The patent specification states that the ratio of the sizes of the two components is selected so as to prevent an excessive sintering of the metal during the heat treatment, which would lead to a reduction of the specific surface and consequently to a lower efficiency of the resulting getter device. The use of an organic component is not discussed.

Finally, U.S. Pat. No. 4,428,856 discloses a porous NEG material containing from 50% to 98% titanium by weight, from 1.5% to 30% of a high melting point metal selected from among niobium, tantalum, molybdenum (Mo) and tungsten (W), and from 0.5% to 20% of titanium hydride ($TiH_2$). This patent states that zirconium powders are readily flammable and explosive, whereby one of the objects of the patent is to provide a getter composition that avoids the use of zirconium.

The porosity and specific surface characteristics of the above-described porous NEG materials, though improved with respect to the conventional NEGs, still are not sufficient for particular applications, such as small-volume getter pumps where high performance is required of the getter material. Thus, it would be advantageous to provide porous NEGs that have good mechanical strength and improved porosity and specific surface characteristics.

SUMMARY OF THE INVENTION

The present invention provides getter materials and getter bodies having the combined properties of good mechanical strength, high porosity and high specific surface characteristics. Thus, the present invention provides getter materials and getter bodies that can be employed in applications requiring high-performance gettering, such as the maintenance of vacuum states using small volume getter pumps.

In one aspect, the present invention provides a method for making a non-evaporable getter material. The method of the invention includes providing a powder mixture that includes a metallic getter element having a grain size smaller than about 70 μm; and at least one getter alloy having a grain size smaller than about 40 μm. Also included in the mixture is an organic component which is a solid at room temperature and has the characteristic of evaporating at 300° C. substantially without leaving a residue on the grains of either the metallic getter element or the getter alloy when the materials forming the mixture are sintered. In addition, the organic powder has a particle size distribution such that about half of its total weight consists of grains smaller than about 50 μm, the remainder of the grains being between about 50 μm and about 150 μm in size. The powder mixture is then subjected to compression at a pressure less than about 1000 kg/cm$^2$ to form a compressed powder mixture. The compressed powder mixture is sintered at a temperature between about 900° C. and about 1200° C. for a period of between about 5 minutes and about 60 minutes. During the sintering, the organic component evaporates from the compressed powder mixture substantially without leaving a residue on the grains of the metallic getter element and the getter alloy to form thereby a network of large and small pores in the getter material.

In one embodiment, the weight ratio between the metallic getter element and the total amount of getter alloy is between about 1:10 and about 10:1. In another embodiment, the weight ration is between about 1:3 and about 3:1. In another embodiment, the weight of the organic compound consists of up to about 40% of the overall weight of the powder mixture. In some embodiments, the getter alloy used is a Zr-containing or Ti-containing binary or ternary alloy. In one particular embodiment, the getter alloy is a Zr—V—Fe tertiary alloy having a weight percentage composition of Zr 70%—V 24.6%—Fe 5.4% and the metallic getter element is zirconium. In another particular embodiment, a second getter alloy is included that has a strong hydrogen gettering capacity. In one embodiment, the second alloy is a Zr—Al alloy, and in a still more particular embodiment, the alloy is one having the percentage weight composition Zr 84%—Al 16%.

In another aspect the present invention includes getter bodies formed from the getter material resulting from the process of the invention. In one embodiment, the getter body is formed into a pellet, a sheet or a disc. These materials can be used in high vacuum getter pumps for achieving high vacuum states in semiconductor processing chambers. Thus, in another aspect, the present invention includes methods and apparatus for fabricating semiconductor devices under a high vacuum.

These and other aspects and advantages of the present invention will become more apparent when the Description below is read in conjunction with the accompanying Drawings.

BRIEF DESCRIPTION OF THE DRAWINGS

FIG. 1b shows a drawing reproducing the microphotograph of FIG. 1a. The black areas of FIG. 1b correspond to regions of St 707 alloy, the gray areas to regions of Zr and the white areas to pores of large size (denoted "1") and pores of smaller size (denoted "2").

FIG. 2b shows a drawing reproducing the microphotograph of FIG. 2a. In FIG. 2b, the black areas correspond to regions of graphite and the gray areas to regions of Zr.

FIG. 3b shows a drawing reproducing the microphotograph of FIG. 3a. The black areas of FIG. 3b correspond to regions of St 707 alloy, the gray areas to regions of Zr.

FIG. 4b shows a drawing reproducing the microphotograph of FIG. 4a. In FIG. 4b, the black areas correspond to regions of graphite and the gray areas to regions of Zr.

FIG. 5b shows a drawing reproducing the microphotograph of FIG. 5a. The black areas of FIG. 5b correspond to regions of St 707 alloy, the gray areas to regions of Zr.

FIG. 6b shows a drawing reproducing the microphotograph of FIG. 6a. In FIG. 6b the black areas correspond to regions of St 101, the gray regions correspond to regions of St 707, and the lighter areas to regions of Zr.

is given as a function of the amount of absorbed CO (Q) measured in cubic centimeter.torricelli per gram of getter material (cc.torr/g).

DESCRIPTION OF SPECIFIC EMBODIMENTS

In one aspect, the present invention provides getter materials having novel structural and functional characteristics that provide excellent gettering performance. In particular, the getter materials of the present invention include a unique network of pores that imparts to the getter materials of the invention high porosity and surface area in addition to good mechanical strength.

Figure 1A:
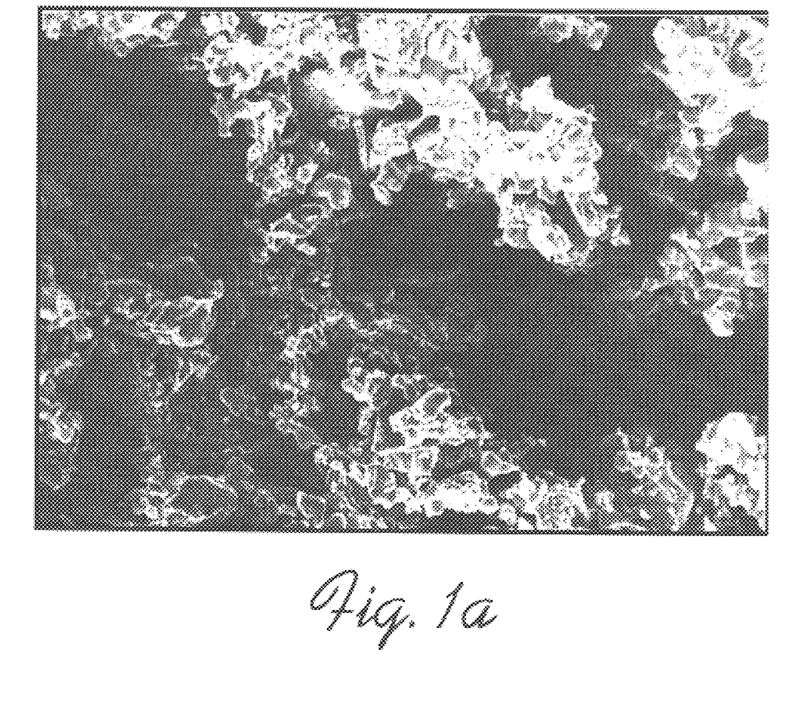
FIG. 1a shows a microphotograph obtained with a scanning electron microscope (SEM), magnification×700, of a getter material of the invention whose preparation is described in Example 1.
Figure 1B:
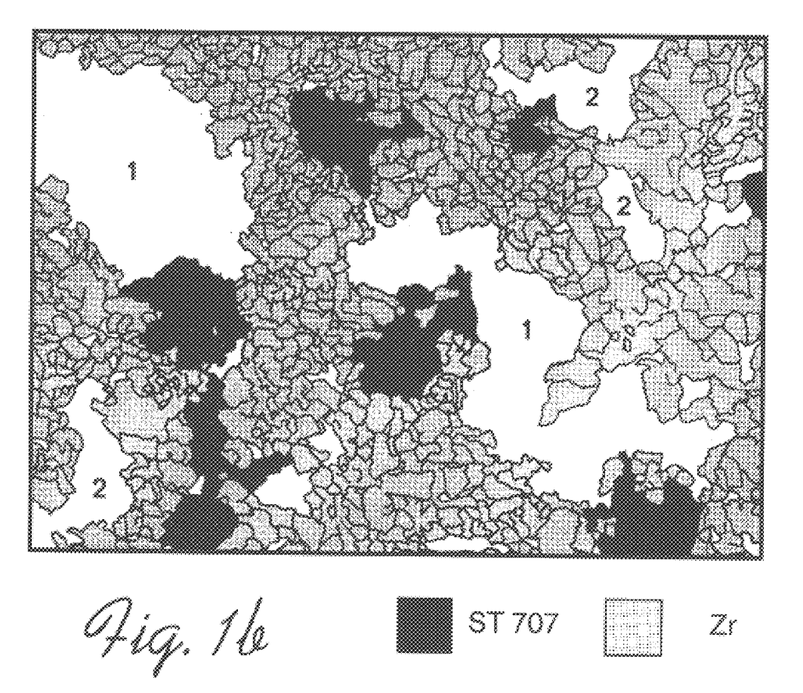
Figure 2A:
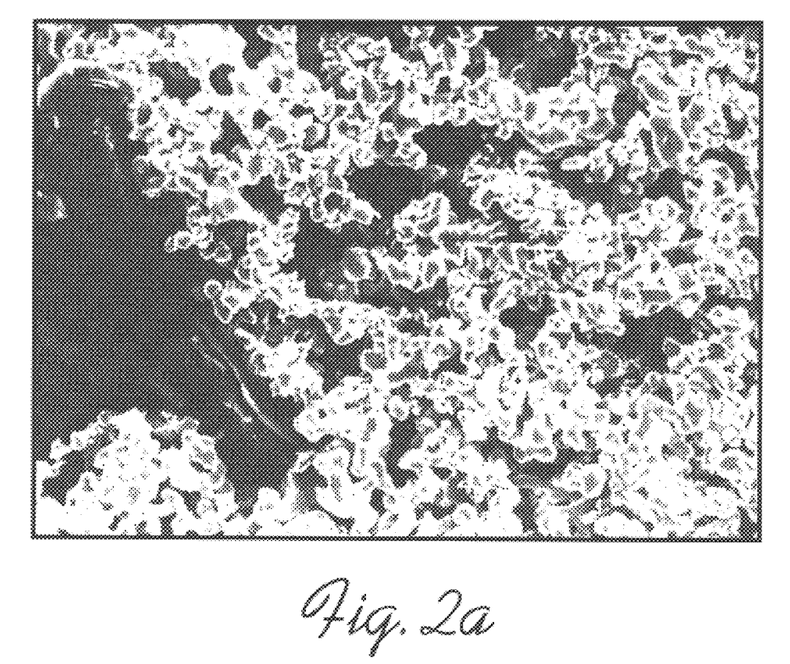
FIG. 2a shows a SEM microphotograph, magnification× 700, of a getter material whose preparation, described in Example 2, following the procedures described in DE-A-2, 204,714 cited above.
Figure 2B:
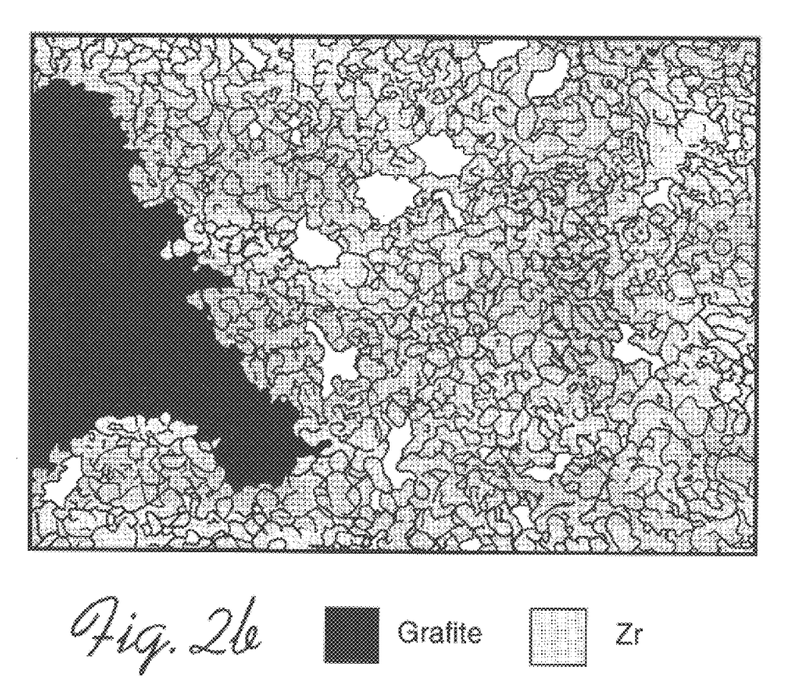
Figure 3A:
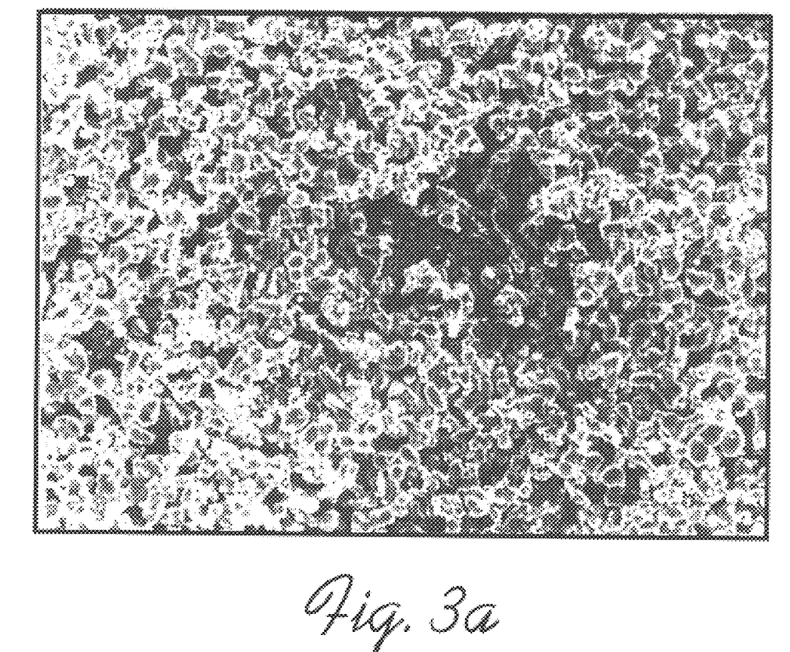
FIG. 3a shows a SEM microphotograph, magnification× 700, of a getter material prepared as described in Example 3 according to the procedures described in GB-2,077,487 cited above.
Figure 3B:
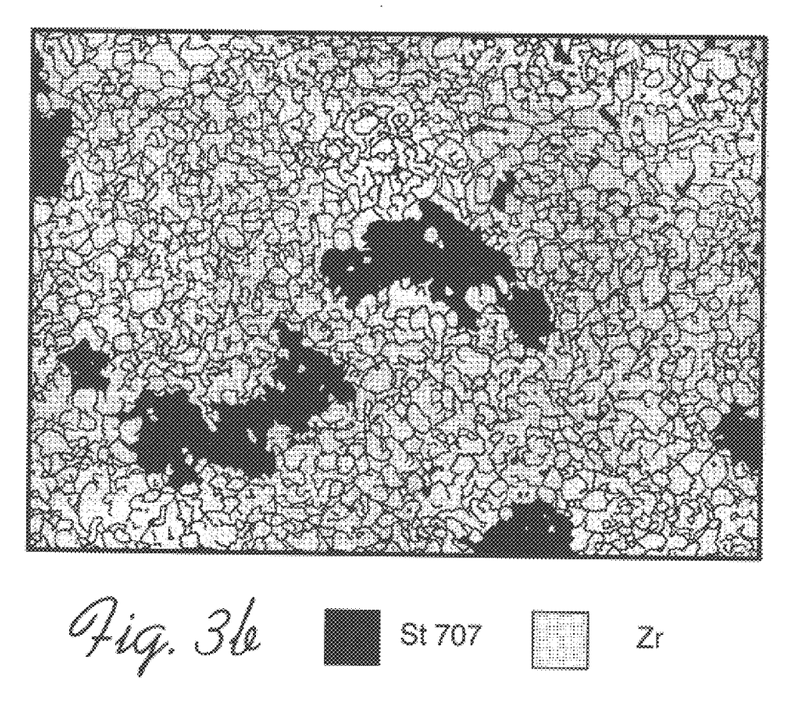
Figure 4A:
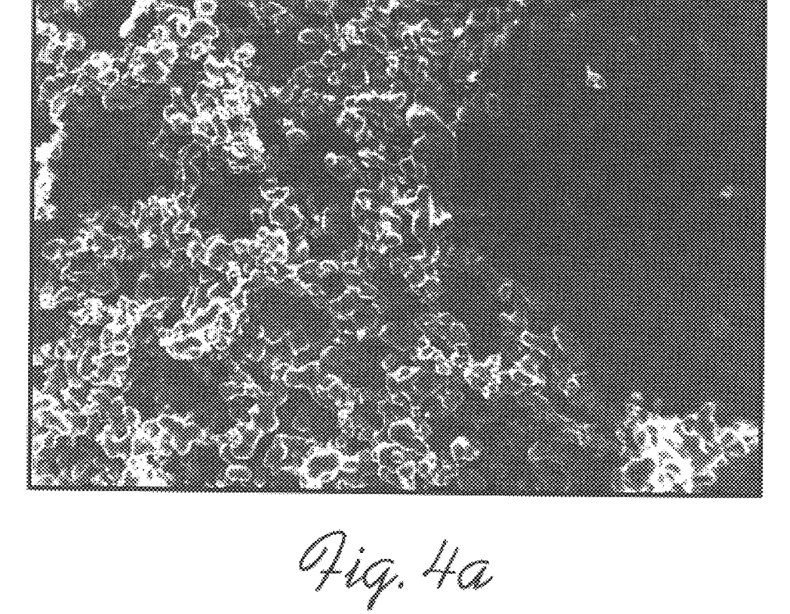
FIG. 4a shows a SEM microphotograph, magnification× 700, of a comparative getter material obtained according to the process described in Example 4.
Figure 4B:
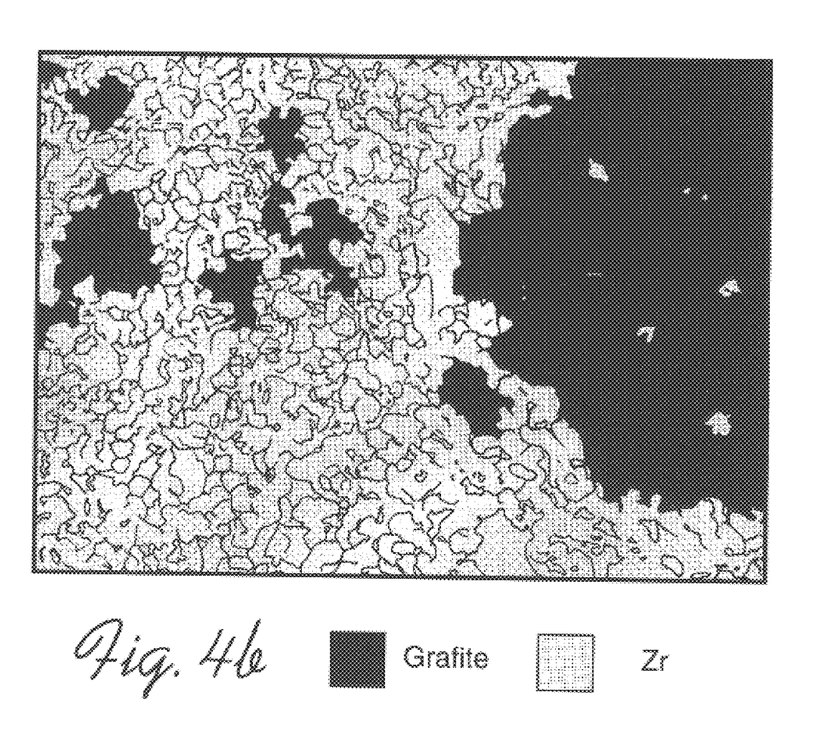
Figure 5A:
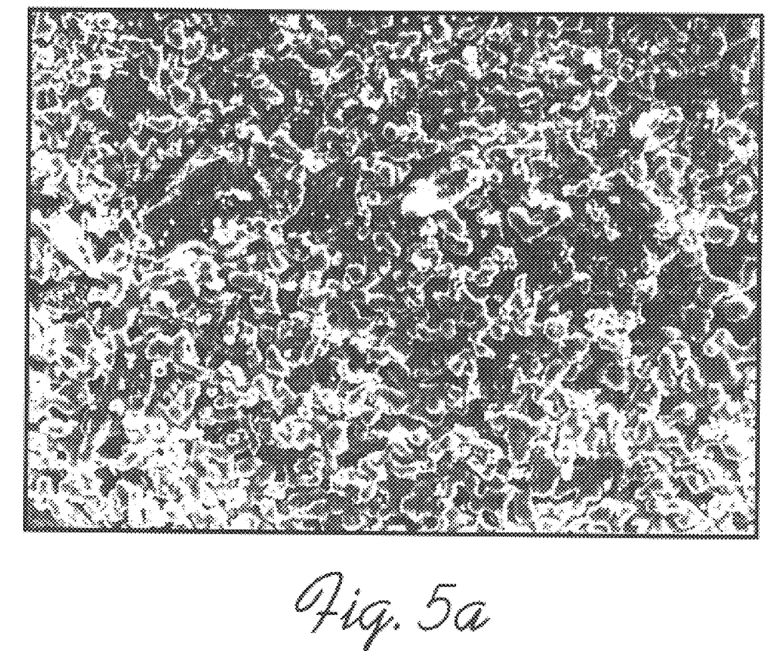
FIG. 5a shows a SEM microphotograph, magnification× 700, of a comparative getter material obtained according to the process described in Example 5.
Figure 5B:
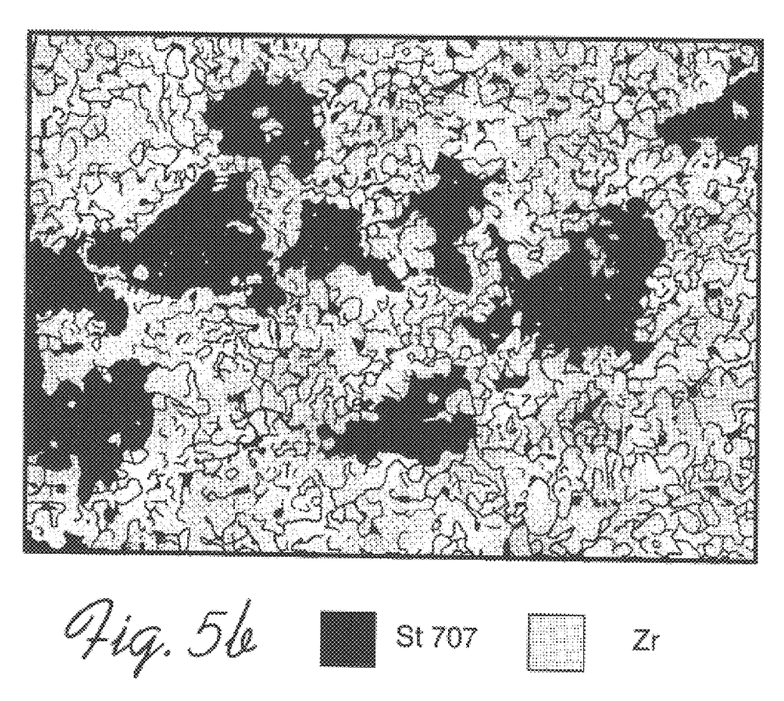
Figure 6A:
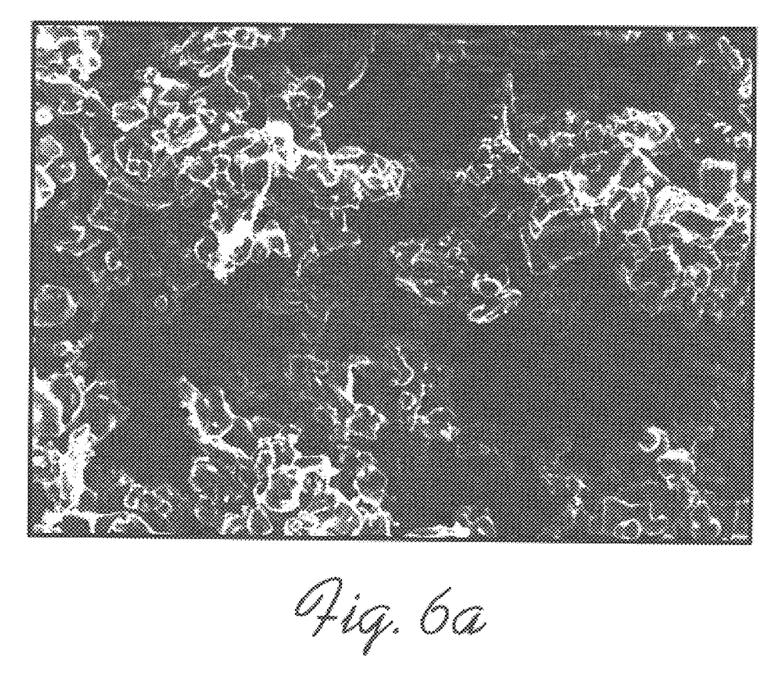
FIG. 6a shows a SEM microphotograph, magnification× 700, of a getter material of the invention whose preparation is described in Example 6.
Figure 6B:
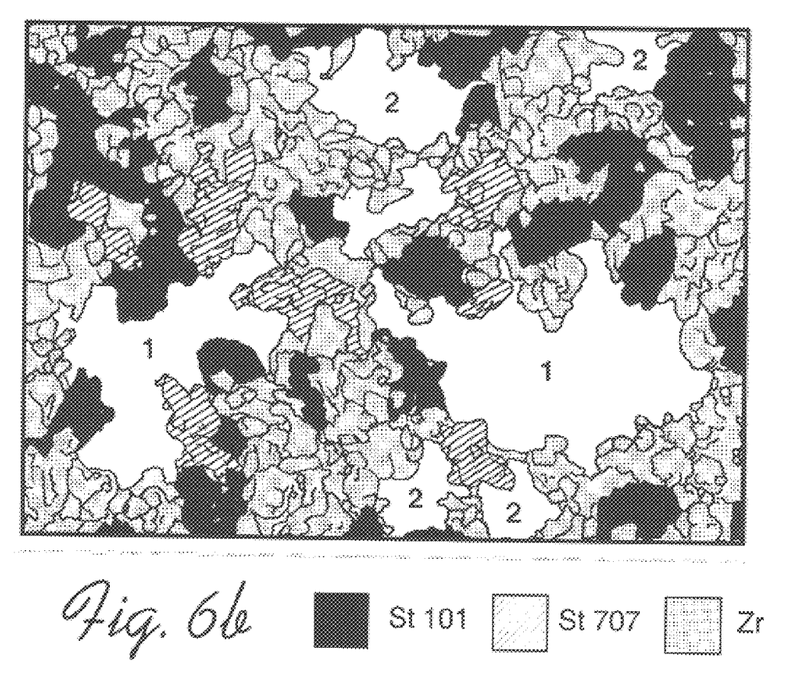

As seen in FIGS. 1a and 1b, the getter materials of the invention comprise a porous internal structure including a first network of large diameter pores 1 providing gas molecules access to the internal portions of the getter material. The first network of pores is combined with a second network of smaller diameter pores 2 that provide access to the surfaces of the single grains of the components which comprise the getter material. From the combination of these two pore networks high values of porosity and surface area, together with good mechanical strength, are imparted to the getter materials of the invention as will be described in greater detail below. This unique structure is obtained by sintering a metallic getter element, a getter alloy and an organic solid as described herein.

In one embodiment, the components of the getter materials of the invention comprise a metallic getter element in combination with a getter alloy. The metallic getter element may be any of the elemental metals employed in the field, such as, but not limited to, zirconium (Zr), titanium (Ti), niobium (Nb), vanadium (V) and tantalum (Ta). Among these titanium and zirconium are preferred. The metallic getter element can be employed in the form of a fine powder having a particle size smaller than about 70 $\mu$m. In one embodiment, the particle size is between about 40 $\mu$m and about 60 $\mu$m.

The getter alloy can be a titanium-based getter alloy that optionally can be combined with one or more transition elements. Alternatively, a zirconium-based alloy, such as, for example, the binary alloys Zr—Al, Zr—V, Zr—Fe and Zr—Ni, or ternary alloys, e.g., Zr—Mn—Fe or Zr—V—Fe can be used. The Zr—V—Fe alloys are described in U.S. Pat. No. 4,312,669 to Boffito, et al., which is incorporated herein by reference. The use of the Zr—V—Fe tertiary alloys is preferred, and in particular the above-mentioned St 707 alloy, having a weight-based percentage composition Zr 70%—V 24.6%—Fe 5.4%. The latter alloy is available commercially from SAES® Getters S.p.A. (Lainate, Italy). According to one embodiment of the present invention, the getter alloy is employed in the form of a powder having a maximum particle size smaller than about 40 $\mu$m. In another embodiment the particle size is smaller than about 30 $\mu$m.

In some embodiments at least a second getter alloy is included. In one particular embodiment, the second getter alloy is chosen from among those getter alloys displaying a strong gettering capacity for hydrogen. Such getter alloys are especially useful in applications where hydrogen is a component of the gas being evacuated as hydrogen sorption by many getter materials is reversible; thus leaving a residual partial pressure of hydrogen in the chamber to be evacuated. In particular, difficulties in obtaining a desired degree of vacuum can arise where a first getter alloy is chosen that is effective for gettering gases other than hydrogen, but which has poor sorption characteristics for hydrogen. However, gettering alloys having a strong gettering capacity for hydrogen can be included with the first getter alloy to reduce the hydrogen partial pressure in the chamber beyond that possible with the first getter alloy alone. Particular examples of such strong hydrogen getters include, but are not limited to, alloys of Zr and Al, and, more particularly, the alloy having the weight percentage composition Zr 84%—Al 16% which is sold commercially under the tradename St 101 also by SAES® Getters S.p.A.

The weight ratio between the metallic getter element and the total amount of getter alloy can vary over a wide range. In one embodiment, the ratios of the metallic getter element and getter alloy are between about 1:10 and about 10:1. In another embodiment this ratio is between about 3:1 and about 1:3. Amounts of the metallic element higher than those indicated above may result in decreased gettering efficiency, whereas the use of excessive amounts of the getter alloys may cause difficulties in sintering the getter bodies obtained from the powder compression, possibly leading to poor mechanical strength.

In one embodiment, the organic compound used in the formation of the getter materials of the invention is a solid at room temperature that is capable of evaporating without leaving significant residues on the grains of either the metallic getter element or the getter alloy when the components are sintered to form the getter material of the invention. In one embodiment, the organic compound is capable of evaporating as described above at temperatures lower than about 300° C., so as not to generate vapors which may react at the temperatures at which the getter materials become active. Some examples of organic materials having these characteristics include, but are not limited to, ammonium oxalate, ammonium benzoate and ammonium carbamate. These materials are available commercially, e.g., from Aldrich Chemical Co. (Milwaukee, Wis.).

According to one embodiment of the invention, the organic compound is employed in the form of a powder. In another embodiment, this powder includes equal portions of particles having a particle size smaller than about 50 $\mu$m and particles having a size between about 50 $\mu$m and about 150 $\mu$m. The weight of the organic compound can be as much as 40% of the combined weights of the metallic getter element and getter alloy powders described above. In one embodiment, the weight of the organic compound is between about 10% and about 35% of the combined weights of the metallic getter element and the getter alloy prior to sintering. If too little of the organic compound is employed, the getter device obtained upon sintering may lack significant porosity; whereas if the amount of organic compound used is greater than about 40% by weight, the getter bodies obtained may lack mechanical stability.

Prior to sintering, the powder mixture is subjected to a light compression at a pressure less than about 1000 kg/cm$^2$. In one embodiment, the compression is at a pressure between about 50 kg/cm$^2$ and about 800 kg/cm$^2$. Using less pressure may produce a final sintered body having a poor mechanical strength, whereas employment of a greater pressure may cause excessive powder compaction reducing the specific surface and, more importantly, reducing the porosity of the getter body. After compression, the powder mixture undergoes a heat treatment in an inert atmosphere or, more preferably, under vacuum, at a temperature between about 900° C. and about 1200° C. In one embodiment the temperature is maintained between about 1000° C. and about 1100° C. for a time between about 5 minutes and about 60 minutes.

The getter materials obtained according to the process of the present invention can be employed in any application requiring the presence of a getter material, for example: in lamps, thermally insulating interspaces (e.g. in thermos bottles) or semiconductor processing chambers to maintain a vacuum (e.g., in semiconductor manufacturing processes such as disclosed in U.S. patent application Ser. No. 08/332,564, the entirety of which is incorporated herein by reference), or in the purification of gases. The getter materials of the present invention can be formed into a variety of shapes and configurations to form getter bodies as will apparent to those having skill in the art. A possible shape of a getter body suitable for the use in thermos bottles is, for example, a pellet, as shown in FIG. 8a.

The functional characteristics of the getter materials of the invention have particular advantages to applications requiring high gas sorption performance with small-volume devices, for example, in small getter pumps. These types of getter pumps are disclosed, for example, in U.S. Pat. Nos. 5,324,172 and 5,320,496. The first of the above-cited two patents discloses a getter pump made with sheet-shaped getter bodies radially arranged around the pump axis. A possible sheet of getter material to be used in this pump is shown in FIG. 8b. The second patent discloses a pump in which the getter bodies are shaped as stacked discs arranged coaxially to the pump body. Possible alternative shapes of discs to be used in a pump similar to that of U.S. Pat. No. 5,320,496, in addition to those described in said patent, are shown in FIGS. 8c and 8d.

Other getter pumps that can be used with the materials and devices described herein are described in co-pending U.S. patent applications Ser. Nos. 08/332,564; 08/348,798; 08/521,943; and 60/015,466, each of which is incorporated herein by reference in its entirety and for all purposes. The cited patent applications disclose inter alia various getter pump configurations in which discs of porous, sintered getter material, such as fabricated using the methods and materials of the present invention, are supported on a support element and are substantially shielded from thermal contact with surrounding surfaces in a semiconductor processing chamber to achieve high vacuum conditions in semiconductor processing chambers for the production of semiconductor devices.

EXAMPLES

The following examples describe specific aspects of the invention to illustrate the invention and aid those of skill in the art in understanding and practicing the invention. However, these examples should not be construed as limiting the invention in any manner.

EXAMPLE 1

This example relates to the preparation of a getter material of the invention.

A mixture was prepared comprising about 2.4 g of metallic zirconium having a particle size between about 40 $\mu$m and about 50 $\mu$m, about 3.6 g of St 707 alloy having a particle size smaller than about 30 $\mu$m and about 4.0 g of ammonium carbamate in two equal portions of about 2 g each, one portion having a particle size smaller than about 50 $\mu$m and the other portion of between about 50 $\mu$m and about 150 $\mu$m, using standard methods. The mixture was homogenized in a V-shaped mixer for about 4 hours and compressed under about 150 kg/cm$^2$ of pressure. The compacted mixture was then sintered in a vacuum furnace by heating over a period of about 2 hours to about 1,050° C. and maintaining the material at that temperature for about 30 minutes. The getter material thus prepared is referred to herein as Sample 1.

EXAMPLE 2 (COMPARATIVE)

This example describes the preparation of a getter material according to the process described in German Patent Application DE-A-2,204,714.

A mixture of about 5.8 g of metallic zirconium having a particle size smaller than about 44 $\mu$m, about 1.2 g of graphite powder having a particle size between about 75 $\mu$m and about 128 $\mu$m, and about 3 g of ammonium carbamate powder having a grain size of about 1 mm was prepared using standard methods. The mixture was homogenized as in Example 1 and sintered by heating to 1,050° C. over a period of about 55 minutes and maintaining it at that temperature for about 5 minutes. The sintered getter body so prepared is referred to herein as Sample 2.

EXAMPLE 3 (COMPARATIVE)

This example describes the preparation of a porous getter material according to British Patent GB-2,077,487.

A mixture of about 4 g of metallic zirconium powder having a particle size smaller than about 44 $\mu$m and about 6 g of St 707 alloy having a particle size between about 53 $\mu$m and about 128 $\mu$m was prepared using standard methods. The mixture was homogenized as in the preceding examples and sintered by following the same heat treatment as in Example 2. The getter body thus obtained is referred to herein as Sample 3.

EXAMPLE 4 (COMPARATIVE)

The preparation of a getter material according to the procedure of Example 2 was repeated but using a finer grain ammonium carbamate powder, with a grain size smaller than about 44 $\mu$m. The getter body thus obtained is referred to herein as Sample 4.

EXAMPLE 5 (COMPARATIVE)

The preparation of a getter material according to the procedure of Example 3 was repeated but wherein the powder mixture was compressed at a pressure of about 70 kg/cm$^2$ prior to sintering. The getter body thus obtained is referred to as Sample 5.

EXAMPLE 6

This example relates to the preparation of a getter material of the invention.

A mixture of about 35 g of metallic zirconium having a particle size of between about 40 $\mu$m and about 50 $\mu$m, about 15 g of St 707 alloy having a particle size lower than about 30 $\mu$m, about 50 g of St 101® alloy having a particle size lower than about 30 $\mu$m, about 13 g of ammonium carbamate having a particle size less than about 50 $\mu$m, and about 20 g of ammonium carbamate having a particle size between about 50 $\mu$m and about 150 $\mu$m was prepared using standard methods. The mixture was homogenized in a V-shaped mixer for about 4 hours; about 1.3 g of the homogenized mixture was compacted by subjection of the mixture to compression at about 600 Kg/cm$^2$ compression. The compacted mixture was then sintered by heat treatment in a vacuum furnace by heating to a temperature of about 1050° C. over a period of about 2 hours and by keeping it at that temperature for about 30 minutes. The getter body thus prepared is referred to as Sample 6.

EXAMPLE 7

Figure 7:
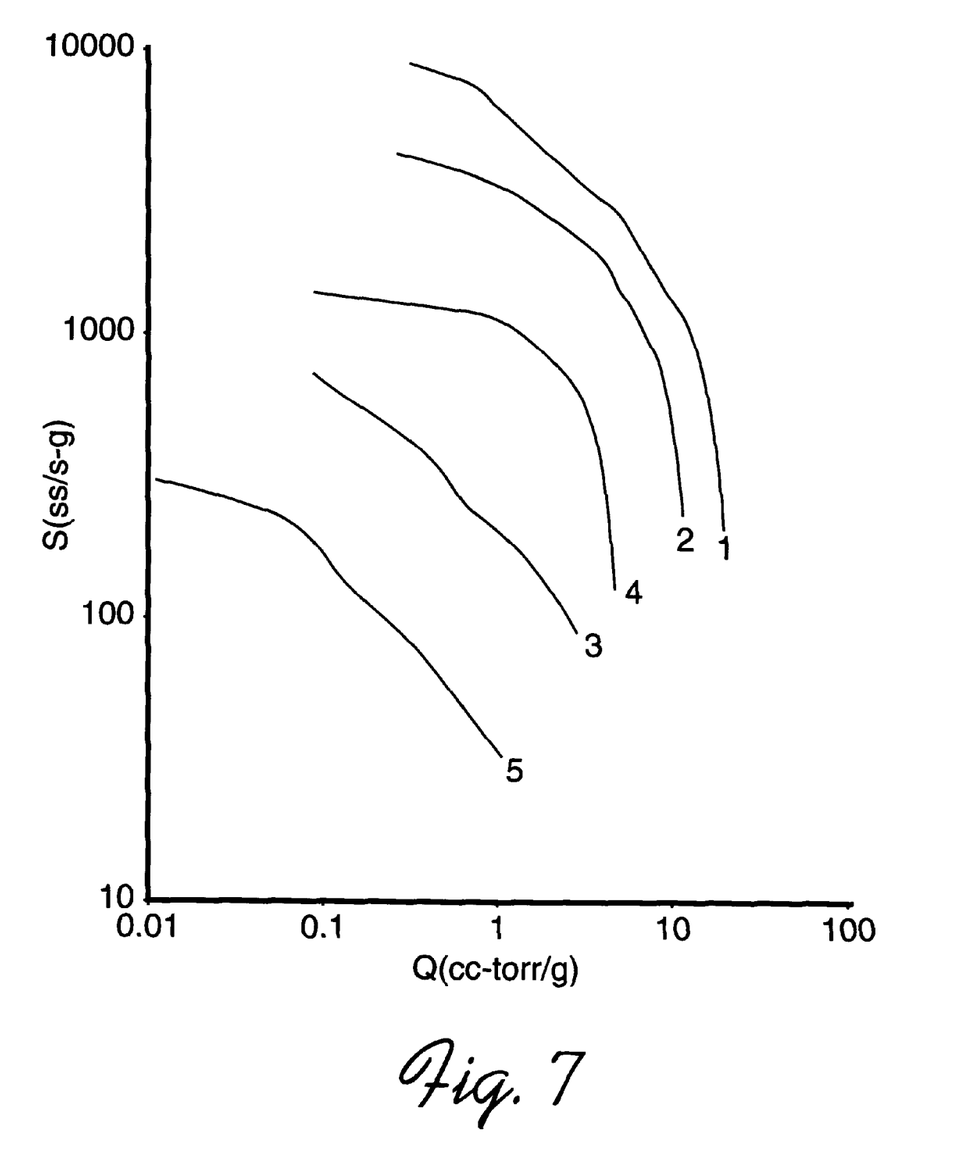
FIG. 7 shows a graph of the gas sorption characteristics of the five samples of getter material of FIGS. 1–6. The CO sorption rate (S), measured in cubic centimeters of absorbed CO per second per gram of getter material $$\left(\frac{cc}{s \cdot g}\right),$$

Measurement of the gas sorption rate and capacity was carried out on Samples 1–5 at room temperature, after activation of the Samples by heating the Samples to about 600° C. for about 10 minutes using standard methods. The gas sorption rate measurements were made by monitoring the time required for each sample to absorb the measured amounts of gas during a series of releases of gas into the test chamber, according to the method described in ASTM F 798-82. The test gas employed was CO. The results of the tests are shown in the graph of FIG. 7 with curves labelled 1–5 corresponding to each of Samples 1–5, respectively.

EXAMPLE 8

Figure 8:
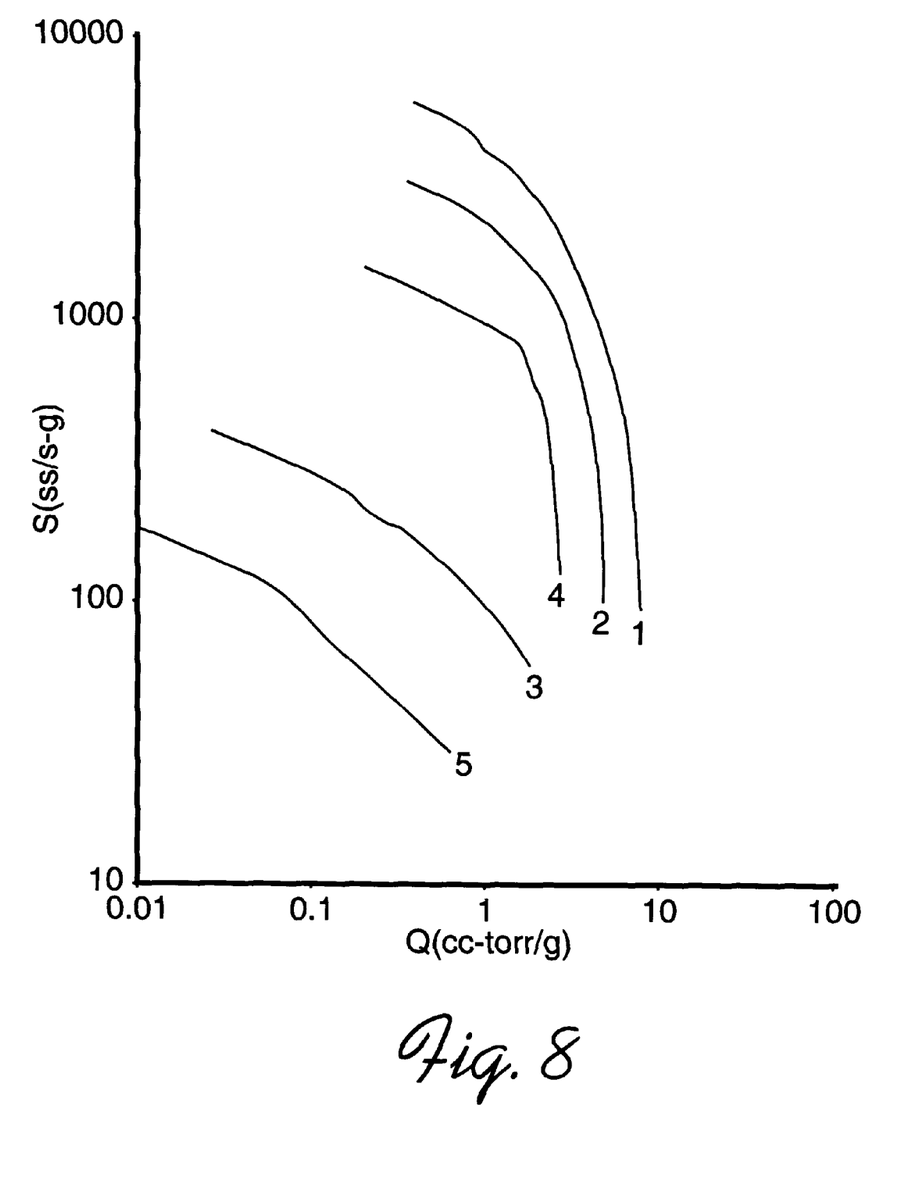
FIG. 8 shows the nitrogen sorption curves for the same samples used with respect to the data shown in FIG. 7.

A measurement of the sorption characteristics of Samples 1–5 was carried out under the same conditions as in Example 6 using nitrogen as the test gas. The results are shown in FIG. 8.

EXAMPLE 9

Figure 9:
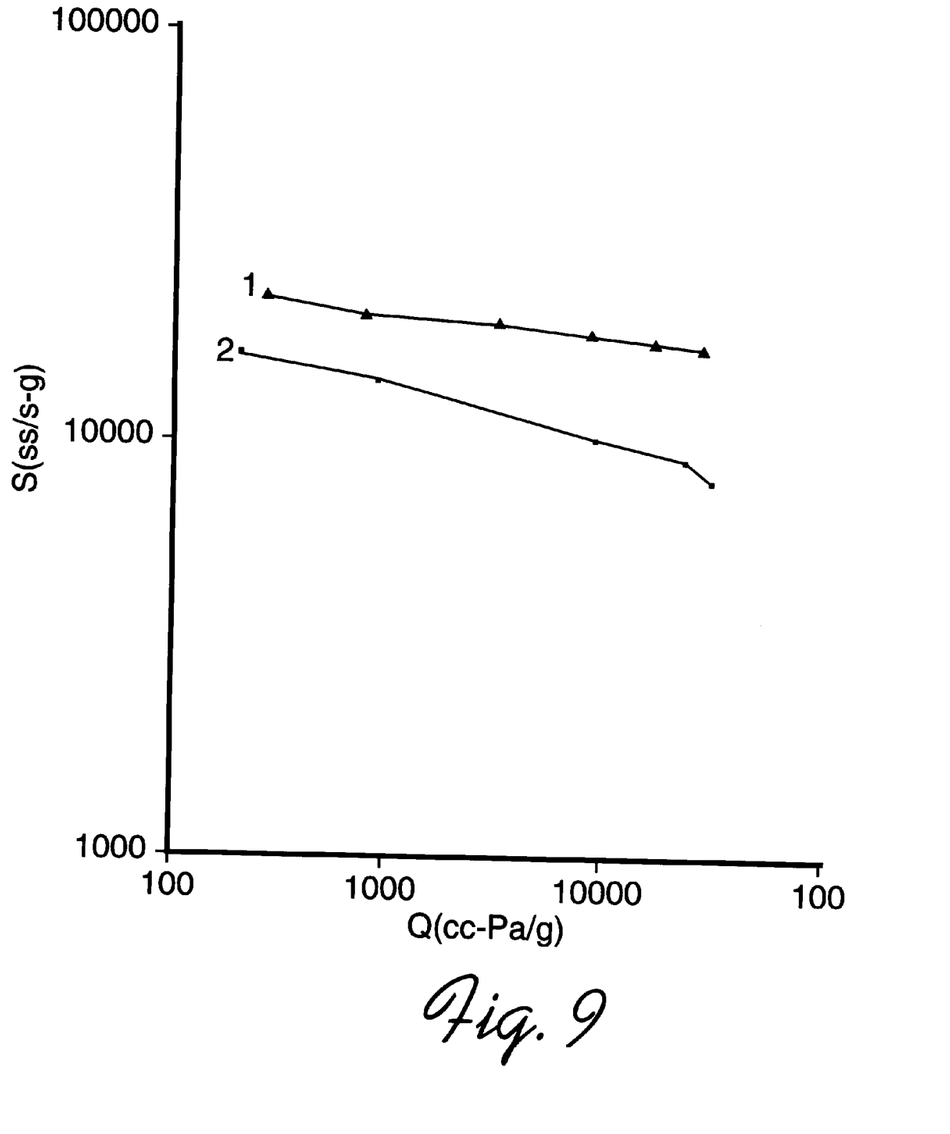
FIG. 9 shows the hydrogen sorption curves for a material of the invention and a comparison material.
Figure 10A:
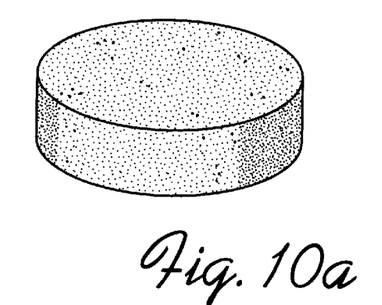
FIGS. 10a, 10b, 10c, and 10d illustrate some possible shapes of getter bodies which can be obtained using the getter material of the present invention.
Figure 10B:
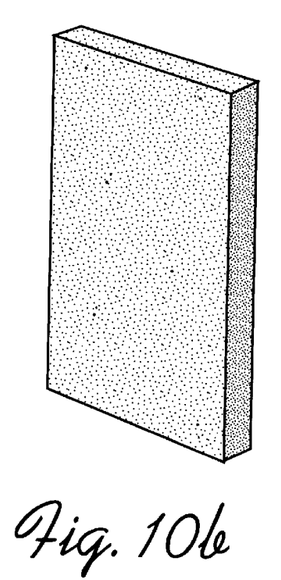
Figure 10C:
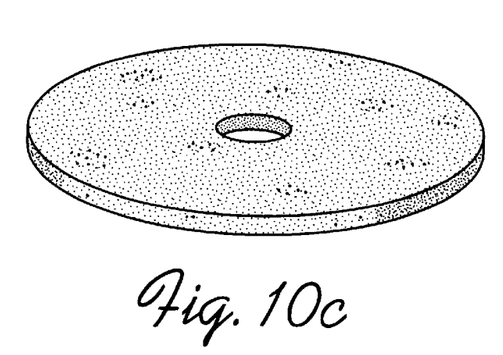
Figure 10D:
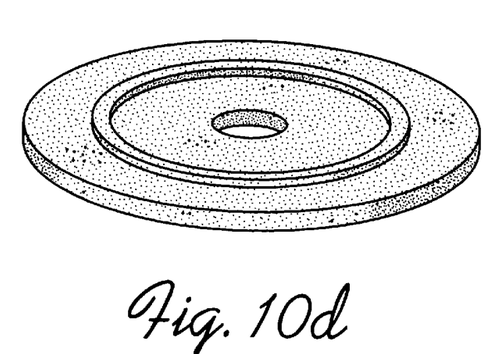

A measurement of the hydrogen sorption rate and capacity was carried out on samples prepared as described in Example 6 above (invention) and Example 2 above (comparative) at room temperature, after activation at about 600° C. for about 30 minutes. The test was carried out according to the methods described in the ASTM F 798-82 standard. The results of the tests are shown in the graph of FIG. 9 as curves 6 and 7 for the two samples prepared as described in Example 6 and Example 2 respectively.

EXAMPLE 10

A measurement of the surface area for each of Samples 1–6 was performed according to the well-known B.E.T. method using a commercially available Quantasorb QS-12 instrument. The results of this test are summarized in Table 1 below.

EXAMPLE 11

The apparent density and the porosity P for each of Samples 1–6 was determined. The apparent density is calculated as the ratio between the weight of a sample and its geometric volume. The term porosity indicates the percent value of porosity as calculated using the following formula:

$$P = (1 - d_{app}/d_t) \times 100$$

where $d_{app}$ is the above-defined apparent density of the sample and $d_t$ is the sample's theoretical density. The value of $d_t$ is calculated from the known absolute densities and weight fractions of the materials making up the sample using the following formula:

$$d_t = \frac{(d_A \times d_B \times d_C)}{(d_A d_B X_C \times d_A d_C X_B \times d_B d_C X_A)}$$

where:

$d_A$ is the density of the first material making up the sample;

$d_B$ is the density of the second material making up the sample;

$d_C$ is the density of the third material making up the sample;

$X_A$ is the weight fraction of the first material making up the sample $X_B$ is the weight fraction of the second material making up the sample; and $X_C$ is the weight fraction of the third material making up the sample.

The results are shown in Table 1 below.

TABLE 1

| Sample | Surface Area (m²/g) | Apparent Density (g/cm³) | Porosity (%) |
| --- | --- | --- | --- |
| 1 | 0.17 | 1.85 | 71.1 |
| 2 | 0.19 | 1.43 | 70.8 |
| 3 | 0.08 | 5.07 | 20.8 |
| 4 | 0.17 | 1.46 | 70.2 |
| 5† | N/A | 6.10 | 4.70 |
| 6 | 0.19 | 2.10 | 63.9 |

†The surface area of Sample 5 was below the sensitivity threshold of the instrument and is assumed to be lower than the value of 0.08 m²/g determined for Sample 3.

The process for preparing comparative Sample 4 is a variation of the process of Example 2 wherein use is made of ammonium carbamate having a particle size smaller than that of Example 2 and comparable to the particle size of the ammonium carbamate used in the process of the invention. Similarly, the process for preparing the comparative Sample 5 is a variation of the process for Example 3, wherein the powder mixture is lightly compressed as in the process of the invention.

As may be noted by examining the microphotographs shown in FIGS. 1–6, Samples 1 and 6, corresponding to a getter materials of this invention, have very different pore structures from those of prior art comparative Samples 2–5. Specifically, the getter devices of the invention have pore structures which consist of macroporosities 1 permeating the sample body and microporosities 2 between the zirconium and alloy grains whereas Samples 2–5 all appear to have much less developed pore networks.

Table 1 above shows that the comparative Samples 2 and 4 have specific surface and porosity values comparable to those of Samples 1 and 6, whereas Samples 3 and 5 have specific surface and porosity much lower than Samples 1 and 6. On the other hand, Samples 2 and 4 have poor mechanical strength, are friable and lose particles easily, making these materials unusable in certain technological applications.

In addition to this improved combination of structural and mechanical characteristics, Samples 1 and 6 of the invention have the best gas sorption characteristics of all of the samples tested, as may be noted by examining the graphs of FIGS. 7–9 wherein the sorption curves at room temperature of Samples 1–6 are given, respectively, for CO and $N_2$ and $H_2$. Sample 1 exhibits much higher sorption for both gases than either Sample 3 or 5 which have less porous structures. Sample 1 also exhibits better sorption capacity for both gases than either Samples 2 or 4, both of whose porosity characteristics more similar to those of Sample 1. Sample 6 shows the same desirable properties of Sample 1 (i.e., good mechanical strength, high porosity, and large specific surface) in addition to strong hydrogen sorption capability. It will also be seen from FIG. 9 that Sample 6 has stronger hydrogen sorption capabilities than Sample 2, although these materials have similar porosities. A comparison of the getter bodies of the invention with the various comparative materials shows that the getter bodies of the invention combine the best mechanical and structural characteristics of the comparative materials while offering the best sorption properties.

Finally, a comparison between the sorption characteristics of Samples 2 and 4 and of Samples 3 and 5 shows that only getter materials produced using the process of the invention can achieve the excellent results described above. In fact, an examination of these Figures reveals that by changing the preparation of Sample 2 (the process according to German Patent Application No. DE-A-2,204,714) in accordance with the process of the invention, i.e. by using ammonium carbamate having finer particle size (Sample 4), the gas sorption characteristics worsen. Similarly, a change in the process for preparing Sample 3 (the process of according to British Patent No. GB-2,077,487) by applying a light compression to the powder mixture in accordance with the process of the invention (Sample 5), also leads to a worsening of the gas sorption characteristics.

In conclusion, the tests show that the Samples prepared according to the method of the invention exhibits the best gas sorption characteristics together with good mechanical strength, making them suitable for technological applications. As can be seen from the discussion of the preparation parameters discussed above, this combination of characteristics depends on the particular process, characterized by the combination of its parameters, and does not derive merely from simple parameter changes of known processes.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that many other getter alloys can be combined with the materials described herein to produce getter materials having desirable performance. Also many other metallic getter elements can be employed with the present invention, as can other organic materials having the properties described above. In addition, those of skill in the art will appreciate that the getter materials and getter bodies of the invention can be used in all applications requiring a getter material. In particular, the getter materials and getter bodies of the invention can be employed with electron tubes (e.g., fluorescent lamps), thermally insulating jackets (e.g., refrigerator panels) and semiconductor processing chambers. In addition, the getter bodies of the invention can be formed into a variety of configurations for use in getter pumps.

What is claimed:

1. A process for preparing a non-evaporable getter material, comprising:

providing a powder mixture including a metallic getter element having a grain size smaller than about 70 $\mu$m, at least one getter alloy having a grain size smaller than about 40 $\mu$m, and an organic powder component which is solid at room temperature and has the characteristic of evaporating at 300° C. substantially without leaving a residue on the grains of said metallic getter element and said getter alloy when said metallic getter element, said getter alloy, and said organic powder component are sintered to form a getter body, wherein said organic powder component has grains with a particle size distribution such that about half of a total weight of said organic powder component consists of grains having a size smaller than about 50 $\mu$m and the remainder of said grains of said organic powder component has a size between about 50 $\mu$m and about 150 $\mu$m;

subjecting said powder mixture to compression at a pressure less than about 1000 kg/cm$^2$ to form a compressed powder mixture; and sintering said compressed powder mixture at a temperature between about 900° C. and about 1200° C. for a period of between about 5 minutes and about 60 minutes wherein said organic component evaporates from said powder mixture substantially without leaving a residue on grains of said metallic getter element and said getter alloy to form thereby a network of large and small pores in said getter body.

2. A process according to claim 1, wherein the metallic getter element is zirconium.

3. A process according to claim 1, wherein the organic powder component is ammonium carbamate.

4. A process according to claim 1, wherein the powder mixture is compressed with a pressure between about 50 kg/m$^2$ and about 800 kg/cm$^2$.

5. A process according to claim 1, wherein the powder mixture is subjected to compression at a pressure in the range from about 150 kg/cm$^2$ to about 600 kg/cm$^2$.

6. A process according to claim 1, wherein the weight ratio between said metallic getter element and the total weight of said getter alloy is between about 1:10 and about 10:1.

7. A process according to claim 6, wherein said weight ratio between said metallic getter element and said total weight of said getter alloy is between about 1:3 and about 3:1.

8. A process according to claim 1, wherein the weight of said organic powder component in said mixture is less than about 40% of the overall weight of said powder mixture.

9. A process according to claim 8, wherein said weight of said organic powder component is between about 10% and about 35% of the overall weight of said powder mixture.

10. A process according to claim 1, wherein said getter alloy is a Ti-based or Zr-based getter alloy including at least one transition element or Al.

11. A process according to claim 10, wherein said getter alloy is an alloy of Ti or Zr and a transition element.

12. A process according to claim 11, wherein said getter alloy is selected from the group consisting of Zr—Al, Zr—V, Zr—Fe, and Zr—Ni.

13. A process according to claim 10, wherein said getter alloy is an alloy of Ti or Zr and two transition elements.

14. A process according to claim 13, wherein said getter alloy is Zr—Mn—Fe, or Zr—V—Fe.

15. A process according to claim 14, wherein said getter alloy is a Zr—V—Fe tertiary alloy having a weight percentage composition of Zr 70%—V 24.6%—Fe 5.4%.

16. A process according to claim 10, wherein the powder mixture comprises first and second getter alloys, said first getter alloy being selected from the group consisting of alloys of Zr containing at least one transition element and alloys of Ti containing at least one transition element, and said second getter alloy having a strong hydrogen gettering capacity.

17. A process according to claim 16, wherein said second getter alloy is an alloy of Zr and Al.

18. A process according to claim 17, wherein said second getter alloy has the composition by weight of Zr 84%—Al 16%.

* * * * *